United States Patent
Kondo et al.

(10) Patent No.: US 6,442,621 B1
(45) Date of Patent: Aug. 27, 2002

(54) EQUIPMENT CONTROL COMMAND PROCESSING SYSTEM AND METHOD THEREOF

(75) Inventors: Satoshi Kondo, Yawata; Kenji Muraki, Osaka; Jiro Yamada, Souraku-gun, all of (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/288,825

(22) Filed: Apr. 9, 1999

(30) Foreign Application Priority Data

Apr. 10, 1998 (JP) .................................. 10-099095

(51) Int. Cl.[7] .............................. G06F 13/10; G06F 3/00
(52) U.S. Cl. ........................... 710/5; 710/55; 710/62
(58) Field of Search .......................... 710/5.6, 19, 52, 710/55, 62, 64, 65; 709/213; 711/100; 455/410

(56) References Cited

U.S. PATENT DOCUMENTS

| | | | |
|---|---|---|---|
| 4,901,232 A | * 2/1990 | Harrington et al. | 710/6 |
| 5,594,740 A | * 1/1997 | LaDue | 455/410 |
| 5,825,739 A | 10/1998 | Saito et al. | |
| 5,915,092 A | * 6/1999 | Morita et al. | 709/213 |
| 6,088,742 A | * 7/2000 | Sim | 710/52 |

FOREIGN PATENT DOCUMENTS

| | | |
|---|---|---|
| EP | 0 467 587 A2 | 1/1992 |
| JP | 6-162740 | 6/1994 |
| JP | 7-192436 | 7/1995 |
| JP | 8-106765 | 4/1996 |
| JP | 97/15052 | 4/1997 |
| JP | 9-120666 | 5/1997 |
| WO | 98/31121 | 7/1998 |
| WO | 99/06997 | 2/1999 |

OTHER PUBLICATIONS

"AV/c Digital Interference Command Set General Specification", Version 3.0 1394 Trade Association, Apr. 15, 1998, pp. 20–34, 49–60.

"AV/c Disc Subit General Specification", Version 1.0, 1394 Trade Association, Jan. 26, 1999, pp. 17–24, 99–101, 126–127.

* cited by examiner

Primary Examiner—Thomas Lee
Assistant Examiner—Thuan Du
(74) Attorney, Agent, or Firm—Wenderoth, Lind & Ponack, L.L.P.

(57) ABSTRACT

In a command processing system for processing a command sent from an external controller (111) to an equipment (100, 200) via a digital interface (112), a status/command storage unit (103) stores the last executed commands to inform the external controller (111) of contents thereof in response to the command. Meanwhile, a management information storage unit stores the management information just before and just after execution of the received command, wherein upon receipt of a command (Z) for inquiring contents of the previously executed commands, the commands (X, Y) stored in the status/command storage unit (103) are read out to produce a response data to the inquiring command. Thus, the user can easily know the content of the last control command provided for controlling equipment.

34 Claims, 6 Drawing Sheets

| AUDIO TRACK NUMBER (=4) |
|---|
| ADDRESS INFO. OF AUDIO TRACK A |
| ADDRESS INFO. OF AUDIO TRACK B |
| ADDRESS INFO. OF AUDIO TRACK C |
| ADDRESS INFO. OF AUDIO TRACK D |

Fig.2B

| AUDIO TRACK NUMBER (=3) |
|---|
| ADDRESS INFO. OF AUDIO TRACK A |
| ADDRESS INFO. OF AUDIO TRACK B |
| ADDRESS INFO. OF AUDIO TRACK D |

Fig.2C

| AUDIO TRACK NUMBER (=4) |
|---|
| ADDRESS INFO. OF AUDIO TRACK A |
| ADDRESS INFO. OF AUDIO TRACK E |
| ADDRESS INFO. OF AUDIO TRACK F |
| ADDRESS INFO. OF AUDIO TRACK D |

Fig.3A

| LAST EXECUTED COMMAND (X) | ~301 |
|---|---|
| SECOND LAST EXECUTED COMMAND (NONE) | ~302 |

Fig.3B

| LAST EXECUTED COMMAND (Y) | ~301 |
|---|---|
| SECOND LAST EXECUTED COMMAND (X) | ~302 |

Fig.3C

| LAST EXECUTED COMMAND (NONE) | ~301 |
|---|---|
| SECOND LAST EXECUTED COMMAND (NONE) | ~302 |

| ID | CONTENTS OF STATUS INFO. |
|---|---|
| 10 | LAST EXECUTED COMMAND |
| 11 | OPERATION STATUS |
| 12 | REPRODUCTION POSITION |
| 13 | REPRODUCTION METHOD |
| 14 | RECORDING POSITION |
| 15 | RECORDING METHOD |

EQUIPMENT CONTROL COMMAND PROCESSING SYSTEM AND METHOD THEREOF

BACKGROUND OF THE INVENTION

1. Field of the Invention

The present invention generally relates to a data recording and/or reproducing apparatus in a data transmission system using a command, and in particular to a system and method of processing an equipment control command sent from an external equipment via a digital interface defined by such as IEEE 1394 Standard for controlling a data recording and/or reproducing apparatus having an optical disk drive, magnetic disk drive and the like.

2. Description of the Prior Art

Recently, use of IEEE 1394 Standard has been increased as a digital interface in a serial data transmission system. The IEEE 1394 system can be used not only for transmission of computer data which is conventionally conducted by a SCSI system or the like, but also used for transmission of substantive audio and/or video (referred to as "AV", hereinafter) data to be processed by an AV equipment. This is because the IEEE 1394 system has two communication methods defined therein, i.e., an isochronous data transmission system and an asynchronous data transmission system.

The isochronous communication is a data transmission method which can be used for transmitting such as substantive AV data requiring a real time property. In this method, a frequency band required for the data transmission is previously obtained prior to the start of the data transmission, and then the data transmission is conducted using the band. By this arrangement, the real time property of the data transmission can be assured.

Meanwhile, the asynchronous communication is a data transmission method using a free time for transmitting auxiliary data such as command or computer data and the like which does not require a real time property. This communication method can be regarded as equivalent to a conventional SCSI method.

Various standards are proposed as a host transmission protocol on the IEEE 1394 system, and IEC 61883 standard is used as one of the methods. The IEC 61883 standard specifies a method of sending and receiving AV data requiring real time property in an isochronous communication system and also specifies a method of sending and receiving a command to be given to an AV equipment in an asynchronous communication system. A set of AV/C commands and responses are transported by Function Control Protocol (FCP) defined by IEC 61883 standard. FCP provides a simple method for encapsulating commands and responses within IEEE 1394 standard.

When the equipment is controlled by the command transmitted on IEC 61883 standard, there may occasionally arise a request for canceling the last executed command. For example, a desire is raised in the following case where audio data is recorded on a plurality of audio tracks formed on an optical disk and a certain audio track data is once deleted and thereafter the executed delete operation per se is required to be canceled so that the deleted audio track data is restored.

However, in the conventional command processing system, when the equipment is controlled by a plurality of controllers, the user cannot know which controller has sent the command of the last control to the equipment. When a certain external controller sends a command to cancel the last executed operation to the equipment, the user can not know whether the control to be canceled is the last control executed by this command source controller. Moreover, in some equipment, the last several commands can be canceled, and in such a case it is necessary to know what kind or item of commands is to be canceled. However, in the conventional system, there is no method for the user to know the contents of commands to be canceled.

Moreover, when an optical disk is loaded on a data recording/reproducing apparatus, management information, such as attributive data, is reproduced and stored as a management information list in a management storage portion of the apparatus. Meanwhile, status information indicating the present operation status of the apparatus such as reproduction or stop, present reproduction position, present reproduction method such as normal reproduction or program reproduction and the like, are stored as a status information list in a status storage portion of the apparatus.

When the user desires to know the contents of the present operation status information of the apparatus, the desired status information of the apparatus can be obtained by accessing the target information list, and the user obtains the contents of the status information as to what status the apparatus operating at present, via the digital interface.

In the conventional system, however, since the contents of the status information are arranged in a fixed manner in bytes, when accessing to the contents of the status information contained in the list, the accessing position in bytes must be designated from the top position in the list. Therefore, if an input of the information contents is erroneously performed even in one byte position in the list, the resultant content is undesirably different from the exact content position. In this undesirable case of erroneous byte position, it is difficult for the external equipment to confirm the erroneous byte position because the external equipment confirms the information list read out from the apparatus as a series of a byte sequence.

In order to achieve the objects mentioned above, the present invention provides a command processing system for processing an equipment control command sent from external equipment via a digital interface, which the system comprises: a system control that receives and executes the command to process management information of main data based on the received command; and a status/command storage that stores the last executed commands processed by the system control, wherein the system control informs the external controller of contents of the last executed commands stored by the status/command storage in response to the command from the external controller.

SUMMARY OF THE INVENTION

The present invention has been developed to solve these problems inherent to the conventional command processing system, and an essential object of the present invention is to provide an improvement of a command processing system and method thereof in which the user can easily know the content of the last control command provided for controlling equipment.

Another object of the present invention is to provide an improvement of a command processing system and method thereof using a specific command adapted thereto, which is capable of storing command contents together with status information contents in a list format, and easily capable of reading the command contents and status information contents from a precise position when accessing thereto.

In order to achieve the objects mentioned above, the present invention provides a command processing system for processing an equipment control command sent from an external equipment via a digital interface, which the system comprises:

a system control means receiving the command and executing the command to process management information of main data based on the received command; and a status/command storage means for storing the last executed commands processed by the system control means, wherein the system control means informs the external controller of contents of the last executed commands stored by the status/command storage means in response to the command from the external controller.

In this construction, the equipment is a data recording and reproducing apparatus having a recording medium in which the main data and management information are recorded thereon and reproduced therefrom.

The system further comprises a management information storage that stores the management information just before and just after execution of the received command by the system control.

The status/command storage means stores the status information indicative of the present operation status of the equipment together with the last executed command. The equipment further comprises a list producer that produces a list of the status information including the last executed command therefrom.

According to another aspect of the present invention, a command processing method for processing a command sent from an external controller to an equipment via a digital interface, comprises: receiving the command and executing the command to process management information of main data based on the received command; storing the last executed commands processed by the command execution; and informing the external controller of contents of the last executed commands stored by the command storage, in response to the command from the external controller.

By this arrangement, all or a part of the management information in the recording medium just before the execution of the command and the command issued from the controller are stored for the execution of the command issued to the equipment. When the equipment receives the command to cancel the last command from the controller, the last management information is restored from the stored management information. The management information can be thereby restored to the status which it had, just before the execution of the command. When the controller inquires about the contents of the stored commands, the contents of the inquired command are outputted to the controller.

In the method of the present invention, when the controller issues the command to cancel the last command over the equipment, the equipment informs the controller of no command to be canceled if there is no command to be canceled. When the controller attempts to change the last command held in the equipment, the equipment rejects the command to change the last command.

Moreover, even when a list of the equipment control command content and/or status information content is renewed, it is not necessary to identify a byte position of the renewed content in the list, and therefore a desired command and/or status information can be easily accessed by way of the same designation method, and whereby a user can obtain a list of the last executed command and status information of the apparatus by a simple construction and method.

BRIEF DESCRIPTION OF THE DRAWINGS

These and other objects and features of the present invention will be readily understood from the following detailed description taken in conjunction with preferred embodiments thereof with reference to the accompanying drawings, in which like parts are designated by like reference numerals and in which:.

DESCRIPTION OF THE PREFERRED EMBODIMENTS

Before the detailed description proceeds, it is noted that like parts are designated by like reference numerals throughout the drawings.

The preferred embodiments of an equipment control command processing system according to the present invention will be described below with reference to the accompanying drawings.

In the present embodiments, it is noted that the explanation is made with regard to an example in the case where audio data is treated as an example of substantive main data, and a data recording and reproducing apparatus is used as an equipment to be subject to a command control, and the recording and reproducing apparatus is provided with a disk drive unit having an optical disk detachably loaded therein as an example of a data recording medium.

Also, in the preferred embodiments of the present invention, it is noted that the scope of the present invention field is within the AV/C commands and responses defined by IEC 61883 standard.

First Embodiment

Figure 1:
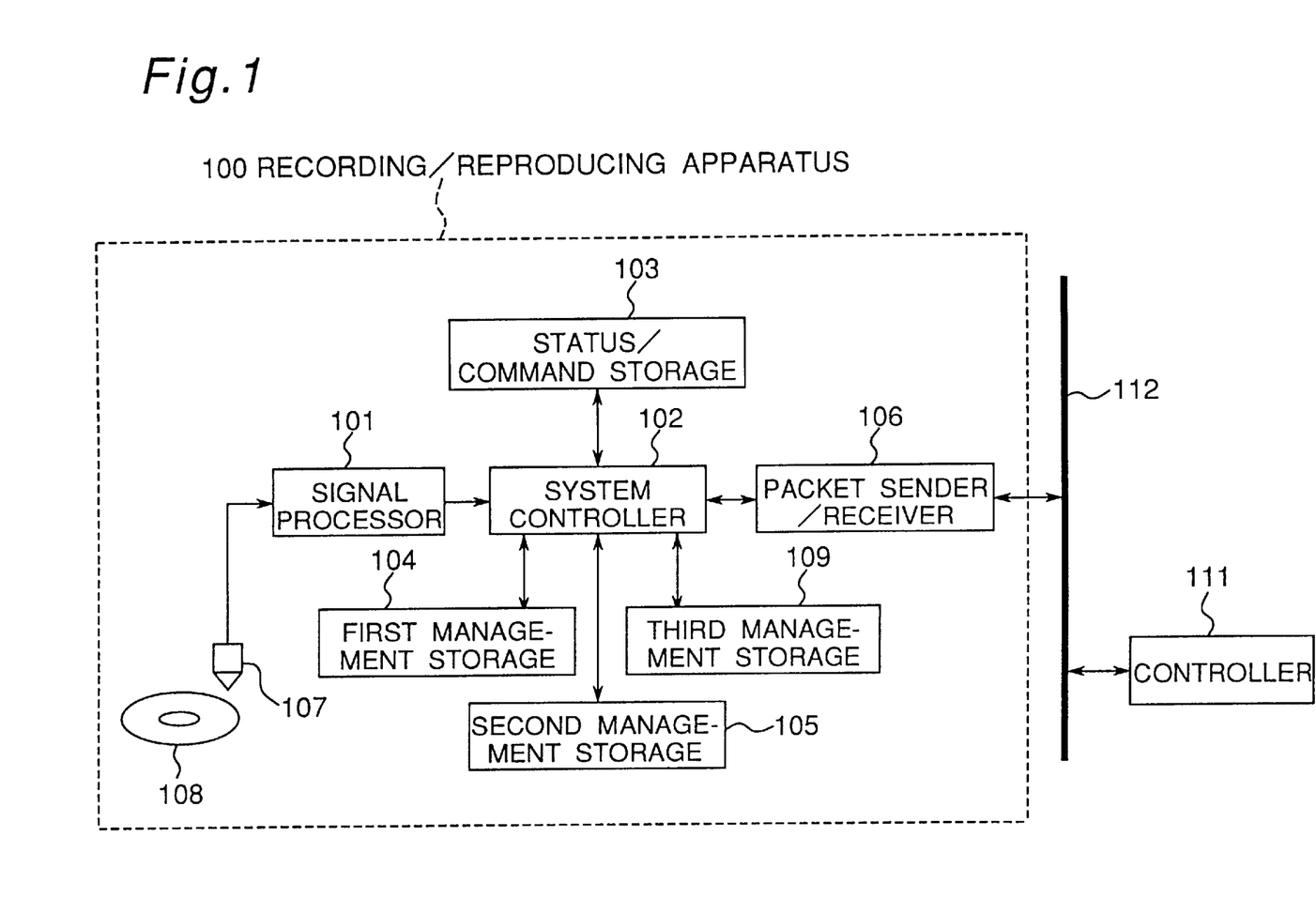
FIG. 1 is a block diagram of a command processing system according to a first embodiment of the present invention.

FIG. 1 shows a schematic construction of a first embodiment of a command processing system according to the present invention, where a recording and reproducing apparatus 100 is used as an equipment to be subject to a command control. The recording and reproducing apparatus 100 includes a reproduction signal processor 101 for demodulation and error correction of reproduction data, a system controller 102 for performing a command control process and controlling all parts of the apparatus 100, and a status/command storage unit 103 for storing command data sent from an external controller 111. The status/command storage unit 103 may store also status information indicative of a present operation status of the apparatus 100.

The apparatus 100 further includes first, second and third management information storage units 104, 105 and 109 for storing management auxiliary data relating to a transaction of the substantive main data. The management information is indicative of such attributes for managing the main data. The apparatus 100 further includes a packet sender/receiver 106 for sending and receiving various data packets via a digital interface 112 to and from the external equipment 111 serving as a command source controller. The apparatus 100 further includes an optical head 107 adapted to an optical disk 108 serving as an example of a recording medium loaded therein.

The apparatus 100 thus constructed is interconnected to the external controller 111 such as a personal computer and the like, via the digital interface 112 defined by e.g. IEEE 1394 Standard, thereby constructing the command processing system in a data communication network in which the data transmission is conducted between the apparatus 100 and the external equipment. In this arrangement, the system controller 102 receives command data from the external controller through the packet sender/receiver 106 and processes the management information relating to the main data recorded on the optical disk, and in response to a request from the external controller 111, the system controller 102 responds to the external controller, informing of the contents of the last executed commands stored in the status/command storage unit 103.

It is noted here that, in this embodiment, the recording/reproducing apparatus 100 can store up to two of the last executed commands and the apparatus 100 can cancel the two last executed commands in the order of new execution.

The operation of the command processing system thus constructed is described below. In this embodiment, the explanation is made with regard to an example in the case where audio data is recorded on the optical disk 108 as an example of the substantive main data and the management information of the audio data is also recorded on the optical disk as an example of the auxiliary data.

Figure 2A:
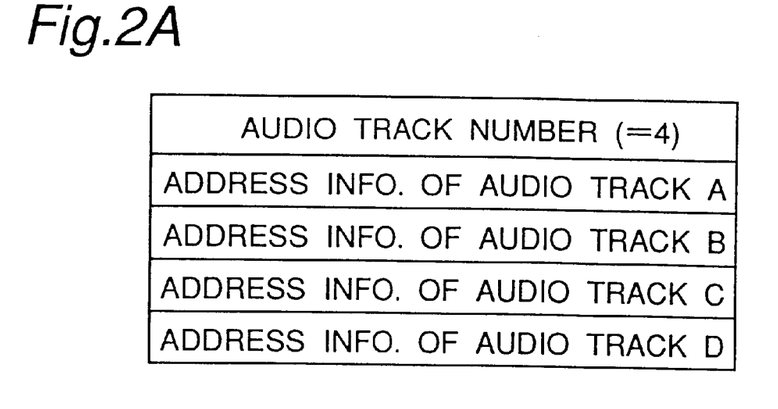
FIGS. 2A, 2B and 2C are explanatory diagrams showing a management information storage state according to a first embodiment of the present invention.

In the construction shown in FIG. 1, when the optical disk 108 is loaded on the apparatus 100, the management information data recorded on a table of content (TOC) region of the optical disk is reproduced through the optical head 107. The reproduced management information data is subjected to a demodulation and error correction decoding process by the reproduction signal processor 101 and the resultant processed management data is inputted to the system controller 102. Then the management information data inputted to the system controller 102 is fed to the first management storage unit 104 to be held therein under the control of the system controller 102. The management information data to be stored in the first management storage unit 104 includes information of the number of the entire recording audio tracks and address information indicative of locations in which the audio tracks are recorded, as shown in FIG. 2A. In this example, there are shown four pieces of address information of four audio tracks A, B, C and D.

In the meanwhile, the command data applied from the external controller 111 is stored in the status/command storage unit 103 under the control of the system controller 102. The status information indicative of the present operation condition of the apparatus 100 may be also stored in the status/command storage unit 103, alternatively may be stored in a separate storage unit (not shown) different from the command storage unit.

The status information to be held in the status storage unit includes operation status information such as PLAY, RECORD, STOP, and present reproduction position or recording position indicative of e.g. music number or time (minute and second), present reproduction method (e.g., normal reproduction, program reproduction or the like), recording method (e.g., sampling frequency number, quantization bit number) and the like.

The following describes an operation when a command X requesting for deleting e.g. the audio track C recorded on the optical disk 108 is transmitted from the external controller 111 to the recording/reproducing apparatus 100.

Figure 2B:
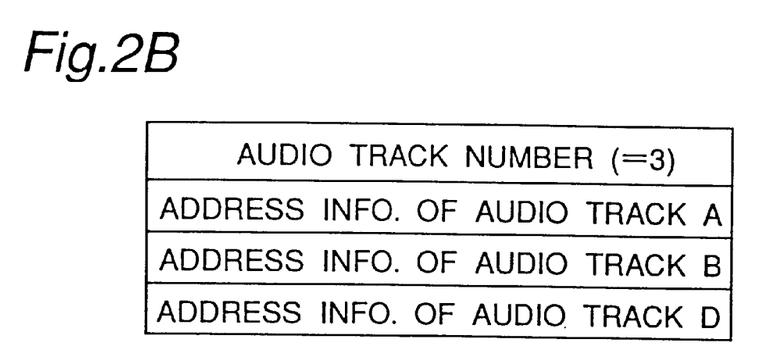

When the command X having a packet data format is transmitted to the apparatus 100 from the external controller 111 through the digital interface 112, the packet sender/receiver 106 analyzes and removes a header of the transmitted packet, and then the command X is fed to the system controller 102. The system controller 102 analyzes the received command X and knows that this command X is a command to delete the audio track C. The system controller 102 reads out the current management information held in the first management storage unit 104 as shown in FIG. 2A, and the read out current management information is fed to the second management storage unit 105 to be held therein by copying. Also, the system controller 102 deletes the address information of the audio track C from the current management information which is read out from the first management storage unit 104, thereby reducing the number of the audio tracks by 1. This changed management information of the audio tracks A, B and D is then written back to the first management storage unit 104 to be held as a newly set-up management information. Thereby, the management information held in the first management storage unit 104 is renewed as shown in FIG. 2B. Meanwhile, the previous management information shown in FIG. 2A is held in the second management storage unit 105.

Figure 3A:
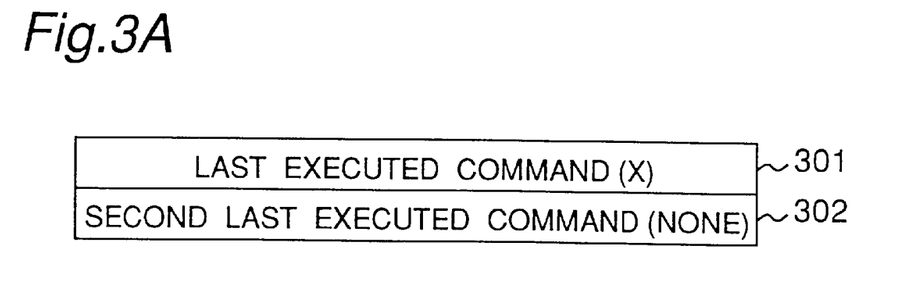
FIGS. 3A, 3B and 3C are explanatory diagrams showing an executed command storage state according to the first embodiment of the present invention.

In the meanwhile, the system controller 102 applies the command X transmitted from the external controller 111 to the status/command storage unit 103 to be held therein. At this step, the command storage status in the status/command storage unit 103 is illustrated in FIG. 3A, which shows the last executed command (X). In this embodiment, it is assumed that the apparatus 100 can store up to two of the last executed commands and the last executed command is stored in a first storage region 301 while the second to last executed command is stored in a second storage region 302. Now, the command X is held as the last executed command in the first storage region 301 while there is no second to last executed command to be held in the second storage region 302 at this stage.

Then, the system controller 102 creates response data indicating that the command X is correctly completed and the created response data is fed to the packet sender/receiver 106. When the packet sender/receiver 106 receives the response data from the system controller 102, the response data is made into a packet format by appending a header and the like. Then, the packet sender/receiver 106 transmits the response of the packet format to the controller 111 via the digital interface 112.

Next, the following describes an operation when the apparatus receives a command Y requesting a division of an audio track B recorded on the optical disk 108 into two tracks, after execution of the command X.

When the command Y in a packet format is transmitted from the external controller 111 via the digital interface 112, the packet sender/receiver 106 processes and removes a header of the transmitted packet, and then the command Y is fed to the system controller 102. The system controller 102 analyzes the received command Y and knows that this command Y is a command to divide the audio track B into two. The system controller 102 reads out the management information shown in FIG. 2A currently held in the second management storage unit 105, and the readout management information shown in FIG. 2A is fed to the third management storage unit 109 to be held therein. The system controller 102 also reads out the management information shown in FIG. 2B currently held in the first management storage unit 104, and the management information shown in FIG. 2B read out from the first management storage unit 104 is fed to the second management storage unit 105 to be held therein.

Figure 2C:
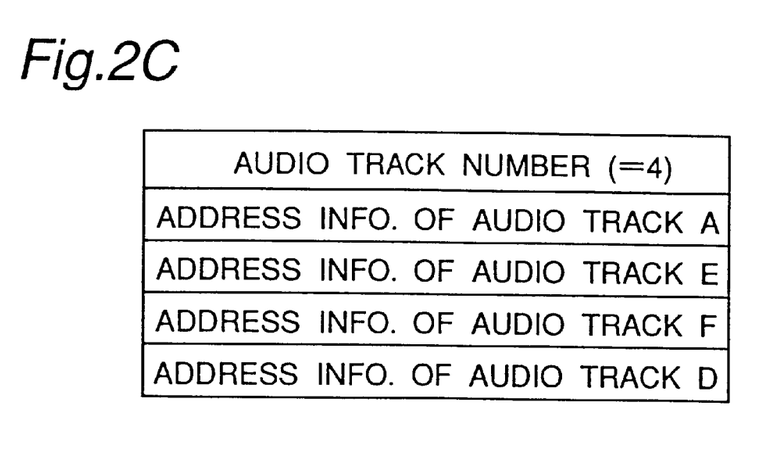

Meanwhile, the system controller 102 divides the audio track B contained in the current management information shown in FIG. 2B read out of the first management storage unit 104 into two audio tracks E and F, so that the address information of the audio track B is changed into two address information of the audio tracks E and F, thereby increasing the number of the audio tracks by 1 as shown in FIG. 2C. This changed management information shown in FIG. 2C is then written into the first management storage unit 104 to be held therein. Thus, the management information held in the second management storage unit 105 is changed to that shown in FIG. 2B. The management information held in the third management storage unit 109 is changed to that shown in FIG. 2A.

Figure 3B:
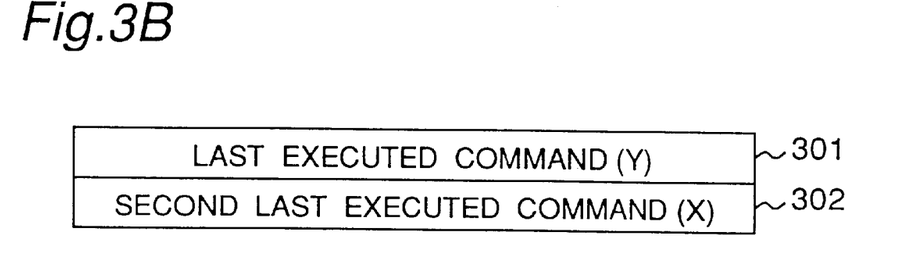

In the meanwhile, the system controller 102 stores the current command Y in the first storage region 301 of the status/command storage unit 103 while the previously executed command X is transported to the second storage region 302 of the status/command storage unit 103 to be stored therein, which the command holding status is shown in FIG. 3B. That is, the command Y is held in the first storage region 301 as the last executed command while the command X is held in the second storage region 302 as the second to last executed command.

Then, the system controller 102 creates the response data indicating that the command Y is correctly completed, and the response data is fed to the packet sender/receiver 106. Upon receipt of the response data from the system controller 102, the packet sender/receiver 106 forms the packet by appending a header to the response data and then transmits the response packet to the controller 111 through the digital interface 109.

Thereafter, the same processing as described above is performed whenever a new command is transmitted from the controller 111. However, in this embodiment, it is noted that the recording/reproducing apparatus 100 can store up to two of the last executed commands. Therefore, the oldest command and the management information corresponding to the oldest command, i.e., the command stored in the second storage region 302 and the corresponding management information stored in the third management storage unit 109 are discarded.

In this embodiment, although the number of the last executed commands is limited to two, it is noted here that any number of commands can be stored by providing one or more additional management storage units.

The following explanation is made assuming that the operation is in the state just after the execution of the commands X and Y in this order where the command holding status is shown in FIG. 3B.

The following describes an operation when the apparatus 100 receives another command Z to confirm the contents of the previously executed commands. When the command Z is transmitted from the controller 111 through the digital interface 112, the packet sender/receiver 106 performs the processing of the header of the transmitted packet, so that the command Z is fed to the system controller 102. The system controller 102 analyzes the received command Z and knows that this command Z is a command requesting for confirmation of the contents of the previously executed commands. Then, the system controller 102 reads out the commands held in the status/command storage unit 103. At this stage, the commands held in the status/command storage unit 103 are in the state shown in FIG. 3B, that is, the command Y is held in the first storage region 301 as the last executed command while the command X is held in the second storage region 302 as the second to last executed command.

Thereafter, the system controller 102 creates, as the response data to the command Z, the data indicating that these two commands X and Y are the last executed commands, and the created response data is fed to the packet sender/receiver 106, where the response data indicates that the command Y is the last executed command while the command X is the second to last executed command. Upon receipt of the response data from the system controller 102, the packet sender/receiver 106 forms a packet format of the response data by appending a header and then transmits the response packet to the controller 111 through the digital interface 112. Thus, the controller 111 can know that the last executed command is the command Y and the second to last command executed before the execution of the command Y is the command X. The execution of the command Z does not cause any change in the contents held in the management storage units 104, 105, 109 and the status/command storage unit 103.

As described above, according to the command processing system of the present embodiment, when the last executed command on the equipment is to be canceled by the external controller 111, the contents of the commands to be canceled can be easily confirmed by executing the command Z. That is, this is accomplished by sending the command inquiring the contents of the command to be canceled to the equipment from the external controller.

Accordingly, when the user wants to cancel a plurality of the last commands, the user can easily know which command is to be canceled with reference to the contents of the last executed commands, allowing the controller 111 to easily control the equipment 100. Moreover, when the equipment is controlled by a plurality of controllers, the user can not know which controller issues the last executed command over the equipment. In this case, even when a certain controller sends the command to cancel the last operation to the equipment, the user can know whether the operation to be canceled is the last command executed by the same controller.

Next, the following describes an operation when the apparatus 100 receives a command U to cancel the last executed command. When the command U is transmitted from the controller 111 through the digital interface 112, the packet sender/receiver 106 performs the processing of the header of the transmitted packet, and then the command U is fed to the system controller 102. The system controller 102 analyzes the received command U and knows that this command U is a command to cancel the last executed command. Then, the system controller 102 reads out the last executed command among from the commands shown in FIG. 3B previously held in the status/command storage unit 103, thereby confirming that the last executed command is the command Y.

Then, the system controller 102 restores the state of the management information returned back to the state just before the execution of the command Y. That is, the system controller 102 reads out the management information (shown in FIG. 2B) held in the second management storage unit 105, which the readout management information is fed to the first management storage unit 104 to be held therein. Meanwhile, the system controller 102 reads out the management information (shown in FIG. 2A) held in the third management storage unit 109, which the readout management information is fed to the second management storage unit 105 to be held therein.

Thus, the management information held in the first management storage unit 104 is changed that shown in FIG. 2B while the management information held in the second management storage unit 105 is changed to that shown in FIG. 2A. Accordingly, the state of the management information is restored to the state just before the execution of the command Y which the state corresponds to that just after the execution of the command X.

In the meanwhile, the system controller 102 deletes the last executed command Y held in the first storage region 301 of the status/command storage unit 103 while the command X stored in the second storage region 302 is transferred to the first storage region 301. Thus, the state of the command held in the status/command storage unit 103 is changed to that shown in FIG. 3A. Therefore, the state of the command held in the status/command storage unit 103 is also restored to the state which is just before the execution of the command Y. Then, the system controller 102 creates the response data indicating that the command U has been correctly completed, and the created response data is made into a packet format by the packet sender/receiver 106, which the resultant response packet is transmitted to the controller 111 through the digital interface 112.

In this embodiment, the last command can be canceled because only the management information on the optical disk 108 is changed without changing the substantive main audio data.

Furthermore, when the controller 111 transmits an additional new command U to cancel the last executed command to the apparatus 100, the target command to be canceled is the command X and the same processing as mentioned above is performed.

As described above, the controller can know the contents of the last executed commands over the equipment and can cancel the target command by the method as described above.

Figure 3C:
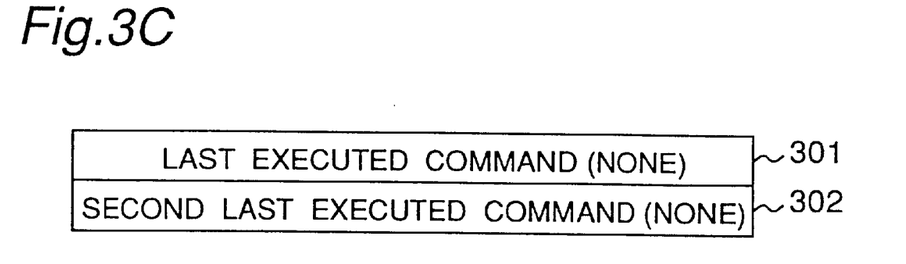

Next, the following describes an operation when the controller 111 transmits a command V to cancel the last executed command to the apparatus 100 under the condition that the contents held in the status/command storage unit 103 are in the status as shown in FIG. 3C where there is no executed command held therein.

When the command V is transmitted from the controller 111 through the digital interface 112, the packet sender/receiver 106 performs the processing of the header of the transmitted packet, and then the command V is fed to the system controller 102. The system controller 102 analyzes the received command V and knows that this command V is the command to cancel the last executed command. The system controller 102 checks the command holding status of the status/command storage unit 103 whether the last executed command is held therein. As a result, the system controller 102 knows that there is no last executed command held in the status/command storage unit 103.

Accordingly, the system controller 102 creates the response data indicating that the command V cannot be executed, and the created response data is fed to the packet sender/receiver 106. Upon receipt of the response data from the system controller 102, the packet sender/receiver forms the response packet by adding a header and the like and transmits the response packet to the controller 111 through the digital interface 112. In this operation, in the case where the command name is represented by e.g. 8 bits, the response data is transmitted in a format using code numbers which are not allocated to the command, for example, all "1", i.e., "FF" in a hexadecimal system.

As described above, in the present embodiment, in the case where there is no command to be canceled held in the storage unit 103, when the controller issues the command to cancel the last executed command over the equipment, the equipment returns a response to the controller that there is no command to be canceled. Accordingly, the controller can easily know that there is no command to be canceled.

Next, the following describes a case where the controller 111 transmits a command W to rewrite the last executed command stored in the first storage region 301 of the status/command storage unit 103. When the command W is transmitted from the controller 111 through the digital interface 112, the packet sender/receiver 106 performs the processing of the header of the transmitted packet, and then the command W is fed to the system controller 102. The system controller 102 analyzes the received command W and knows that this command W is a command to rewrite the last executed command held in the first storage region 301. In this embodiment, since the system controller is established to give a reject as a response to such a command W requesting for rewriting the last executed command, therefore the system controller 102 creates the response data indicating that the command W is refused. The created response data is made into the packet format by the packet sender/receiver 106 and transmitted to the controller 111 through the digital interface 112.

As described above, according to the present embodiment, when the external controller attempts to change or rewrite the last executed command held in the status/command storage unit 103 in the equipment, the equipment refuses the command to change the last command. Accordingly, the command from the controller does not cause the inadvertent rewrite of the contents held in the status/command storage unit 103. It is therefore ensured that the contents held in the status/command storage unit 103 are rewritten only when the controller executes the command to operate the contents of the management information such as deletion or division command.

In the embodiment of the present invention, the optical disk 108 is used as a recording medium. However, other recording medium such as a magnetic tape, magnetic disk and the like may be used.

In the embodiment, although the management information has the structure shown in FIGS. 2A–2C, the information having other structure may be used as the management information.

In the embodiment, although the audio data is recorded as the substantive main data in the recording medium, other data such as image or video data may be used.

In the embodiment, although all the last management information is stored in the second management storage unit, it is not necessary to hold all the management information and only the information alone required for the restoration may be held.

In the embodiment, although the number of the last executed commands to be held is limited to two, any number of the commands may be held.

In the embodiment, although the explanation is made in the case of using one external controller for controlling the apparatus 100, a plurality of controllers may be used.

In the embodiment of the present invention, in the case where the controller 111 transmits the command Z to know the contents of the previous executed commands, the response data thereto is created indicating that two commands, i.e., the last executed command Y and the second last executed command X are the last executed commands. However, the data indicating that the last executed command is the command Y may be created as the response data to the command Z.

Second Embodiment

Figure 4:
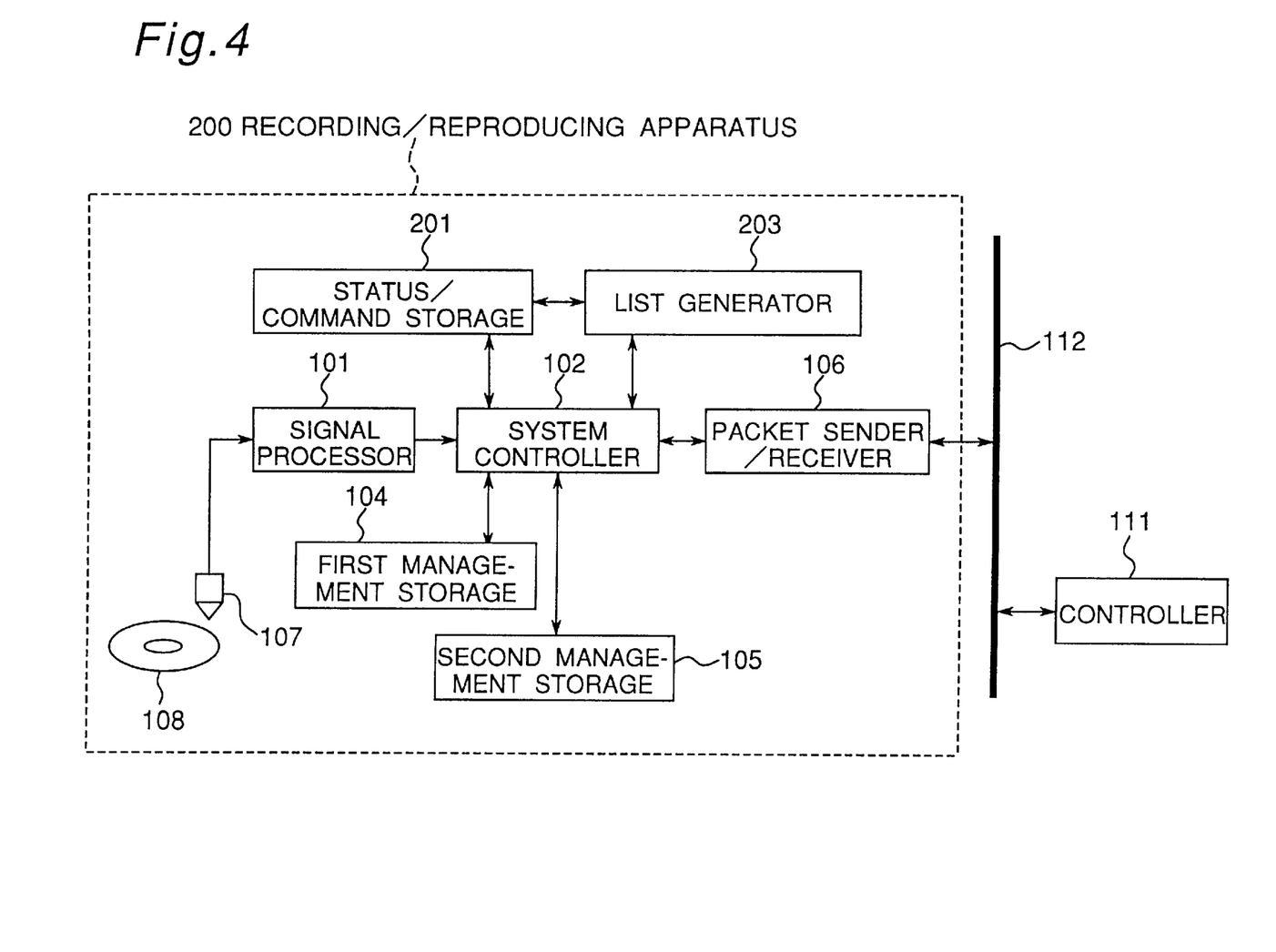
FIG. 4 is a block diagram of a command processing system according to a second embodiment of the present invention.

FIG. 4 shows a schematic construction of a command processing system using a recording and reproducing apparatus 200 according to the second embodiment of the present invention. The second embodiment shown in FIG. 4 is different from the first embodiment shown in FIG. 1 in that the recording and reproducing apparatus 200 is provided with a status/command storage unit 201, which stores the operation status information of the apparatus together with the executed commands, and is further provided with a list generator 203, which is used in combination with the status/command storage unit 201 to thereby generate a list of the command/status information. The other basic structure and operation thereof is similar to that of the first embodiment, and therefore the explanation of the redundant portions is omitted here for brevity. Also, in this embodiment, it is noted that the third management storage unit 109 shown in FIG. 1 is omitted for brevity so that the explanation is made for the case where the apparatus can store only one last executed command.

In the recording and reproducing apparatus 200, the status/command storage unit 201 stores the status information indicative of the present operation condition of the apparatus 200 together with the last executed commands applied from the external controller 111 under the control of the system controller 102. The status information includes operation status information such as PLAY, RECORD, STOP, and present reproduction position or recording position, present reproduction method (e.g., normal reproduction, program reproduction or the like), recording method, and the like. That is, the last executed command information may be regarded as one example of information included in the status information of the present operation status.

In this construction, when a command for deletion or division is transmitted to the apparatus 200 from the external controller 111 via the digital interface 112, the applied command is received by the packet sender/receiver 106 and stored in the status/command storage unit 201 under the control of the system controller 102.

Next, the following describes an operation of inquiring the status information of the operation of the apparatus 200 stored in the status/command storage unit 201. When the data sender/receiver 106 of the apparatus 200 receives a packet including the command for inquiring the status information, the packet sender/receiver 106 analyzes and removes the header from the packet and applies the command to the system controller 102.

The system controller 103 analyzes the command and confirms that the command is for reading the status/command information. Then the status/command information held in the status/command storage unit 201 is read out and fed to the list generator 203 under the control of the system controller 102. Upon receipt of the status/command information, the list generator 203 converts the status/command information into a list format structure by appending specified ID codes to the corresponding status/command information items as shown in FIG. 5A.

Thus, the desired status/command information is obtained in the list and applied to the system controller 102. The system controller 102 obtains the desired status/command information list from the status/command storage unit 201 by way of the list generator 203. Then, the desired status/command information list is fed to the data sender/receiver 106 and the list is made into a packet format by adding a header thereto and the packet including the desired status/command information list is returned to the external controller via the digital interface.

Figure 5A:
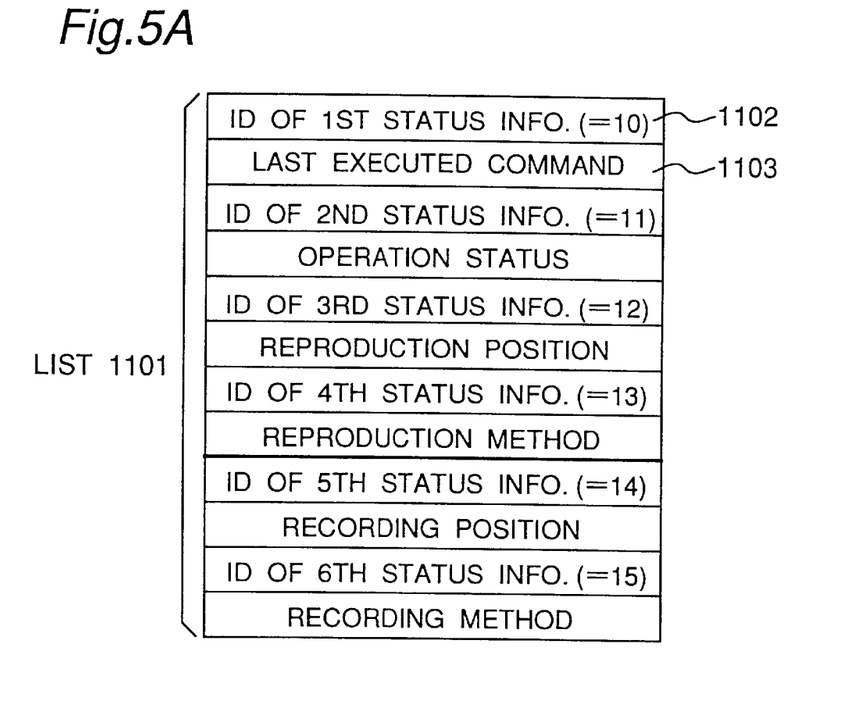
FIGS. 5A and 5B are explanatory diagrams showing a status information list and ID list appended thereto, respectively according to the second embodiment of the present invention.
Figure 5B:
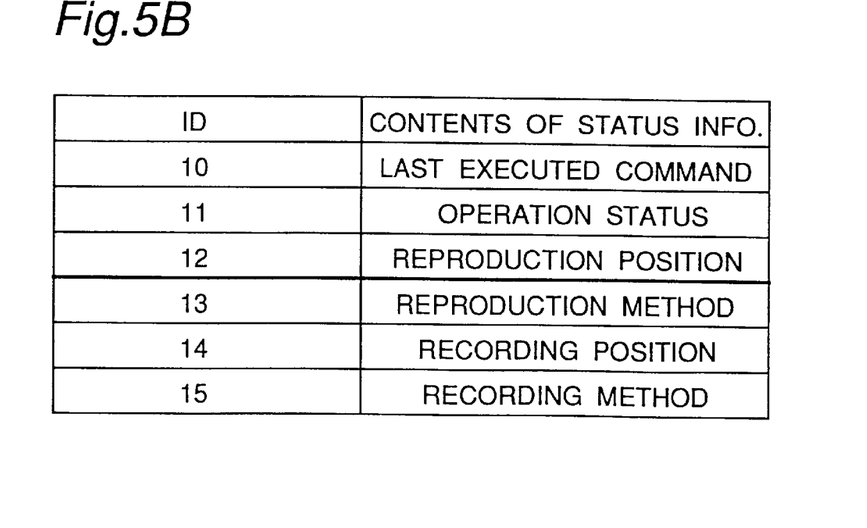

FIG. 5A shows an example of a list structure of the status/command information, where the status information includes the last executed command 1103 as the first status information, operation status as the second status information, reproduction position as the third status information, reproduction method as the fourth status information, recording position as the fifth status information and recording method as the sixth status information, and the list generator 203 produces the status information list 1101. As shown in FIG. 5A, when the status information contents are listed by the list generator, each content of the status information is appended with a corresponding ID code. When accessing to a desired status information content, the ID code is used as an accessing key or search key to thereby read out the target content of the status information. FIG. 5B shows an example of a relationship between the status information items and the ID codes 10 to 15 corresponding thereto, respectively. When the apparatus 100 is exclusively dedicated for a reproduction one, the status information does not includes a recording position and recording method.

Figure 6A:
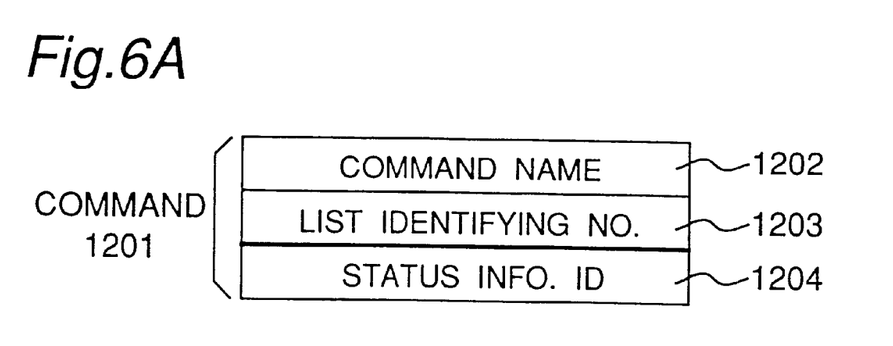
FIGS. 6A and 6B are explanatory diagrams showing command and response according to the second embodiment of the present invention.

A method of accessing the status information using an ID code serving as addressing key is described below. FIG. 6A shows an example of a command 1201 for reading the status information. The command 1201 has a data structure including a command name field 1202, list designation field 1203 for identifying the number of the list and status information ID field 1204. Since the command 1201 is a reading command, the command name (1202) is represented by e.g. READ.

Specifically, the command name field 1202 is for identifying the content of the command and the list designation field 1203 is for designating the status information list. In order to designate the list, the list number assigned thereto is used.

When the last executed command is desired to be read out, the reading command 1201 has the list designation field (1203) represented by a predetermined identification number previously allocated to the status information list 1101 and the status information ID (1204) represented by "10" with reference to FIG. 5B.

When the reading command 1201 in the packet format is transmitted to the packet sender/receiver 106 via the digital interface 112, the header is removed and the command is fed to the system controller 102. The system controller 102 analyzes the received command and knows that this command is a command for accessing to the status information, based on the list identification number and further knows that the command is a command for reading the last executed command, based on the status information ID being "10". Then the last executed command is read out from the status/command storage unit 201 and converted into a list format by means of the list generator 203, and the resultant command of the list format is fed to the system controller 102.

Thus, in the present embodiment, the command data includes an ID-code field indicating an ID code of the desired status information content to be accessed, whereby the desired status information content is identified in address position in the list and obtained by accessing. In this case, the last executed command is can be read out.

Figure 6B:
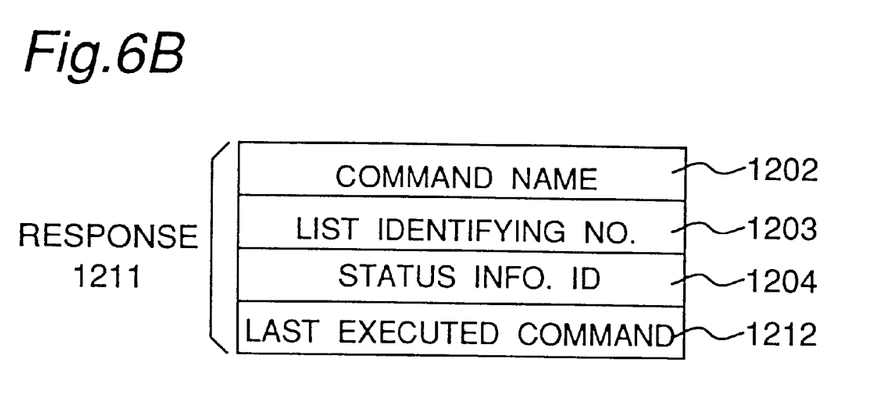

Then the system controller 102 produces a response 1211 shown in FIG. 6B as a response to the command 1201 using the contents 1212 of the last executed command obtained as mentioned above. That is, in the case where the command contains an ID code of status information desired to be accessed and is for accessing to read the desired status information in the status information list, the response to the command is produced by appending the obtained status information to the command. The produced response data is made into a packet by adding a header so as to be transmitted to the external controller via the digital interface 112.

As described above, according to the present invention, the list of the status information is produced by appending a corresponding ID code to each of the information contents. When accessing the contents in the information list, the ID codes are used as an accessing or search key for obtaining the desired information to be read. Therefore, the exact contents of the last executed commands can be easily obtained. Moreover, it is not necessary to designate the address position in bytes from the top in the list as required in the conventional method, and accordingly the accessing to an erroneous position in the list can be effectively avoided, which assures the exact access to the desired information.

Accordingly, when the user wants to cancel a plurality of the last commands, the user can easily know which command is to be canceled with reference to the contents of the last executed commands, allowing the controller to easily control the equipment. Moreover, when the equipment is controlled by a plurality of controllers, the user can not know which controller issues the last executed command over the equipment. In this case, even when a certain controller sends the command to cancel the last operation to the equipment, the user can know whether the operation to be canceled is the last command executed by the same controller.

As described above, in the present invention, in the case where there is no command to be canceled held in the storage unit, when the controller issues the command to cancel the last executed command over the equipment, the equipment returns a response to the controller that there is no command to be canceled. Accordingly, the controller can easily know that there is no command to be canceled.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A command processing system operable to process a plurality of commands sent from an external controller to equipment via a digital interface, said command processing system comprising:

a system controller being operable to receive the commands, execute the commands, and process management information of main data based on the commands;

a status/command storage unit being operable to store executed commands; and a management information storage unit being operable to store management information just before execution of a received command that is received by said system controller and management information just after execution of the received command, wherein said system controller is operable to inform the external controller of content of a predetermined number of executed commands stored by said status/command storage unit in response to an inquiring command from the external controller, wherein upon receipt of a canceling command for canceling a most recently executed command, said system controller judges whether the most recently executed command is present in said status/command storage unit, and wherein when said system controller judges that the most recently executed command is present in said status/command storage unit, management information stored in said management storage unit just before execution of the most recently executed command is read out as prior management information and management information just after the execution of the most recently executed command is replaced with the prior management information while the most recently executed command is deleted from the executed commands stored in said status/command storage unit.

2. The command processing system of claim 1, wherein, upon receipt of an inquiring command for inquiring as to contents of the executed commands, the executed commands stored in said status/command storage unit are read out as response data.

3. The command processing system of claim 1, wherein said status/command storage unit is operable to store status information indicative of a present operation status of the equipment together with the most recently executed command, and wherein said command processing system further comprises a list generator operable to produce a list of the status information including the most recently executed command.

4. The command processing system of claim 3, further comprising a table of ID codes, wherein the status information includes a plurality of items, wherein each ID code in said table of ID codes is assigned to a corresponding item in the plurality of items, wherein said list generator is operable to produce the list by appending each ID code to its corresponding item to thereby access content of a desired item in the list with reference to the ID code appended thereto.

5. The command processing system of claim 4, wherein an access command for accessing a desired item and obtaining content of the desired item includes an ID-code field, indicating an ID code of the desired item for which content is to be obtained, and wherein the ID code identifies an address position of the desired item in the list.

6. The command processing system of claim 4, wherein the list includes a data structure having continuous plural pairs of items of status information content and corresponding ID codes added thereto.

7. The command processing system of claim 3, wherein, upon receipt from the external controller of an inquiring command that requests the list and content therein, a response is produced in response to the inquiring command, wherein the inquiring command comprises a command name field indicative of a command name and a list designation field for designating a list of the items, and wherein the response comprises the list and includes a data format of a combination of the status information added to the inquiring command.

8. A command processing system operable to process a plurality of commands sent from an external controller to equipment via a digital interface, said command processing system comprising:

a system controller being operable to receive the commands, execute the commands, and process management information of main data based on the commands;

a status/command storage unit being operable to store executed commands; and a management information storage unit being operable to store management information just before execution of a received command that is received by said system controller and management information just after execution of the received command, wherein said system controller is operable to inform the external controller of content of a predetermined number of executed commands stored by said status/command storage unit in response to an inquiring command from the external controller, wherein upon receipt of a canceling command for canceling a most recently executed command, said system controller judges whether the most recently executed command is present in said status/command storage unit, and wherein when said system controller judges that the most recently executed command is present in said status/command storage unit, management information stored in said management storage unit just before execution of the most recently executed command is read out as prior management information and management information just after the execution of the most recently executed command is replaced with the prior management information, and the most recently executed command is deleted from the executed commands stored in said status/command storage unit.

9. A system comprising:
an external controller;
a digital interface;
a system controller being operable to receive the commands, execute the commands, and process management information of main data based on the commands;
a status/command storage unit being operable to store executed commands;
a management information storage unit being operable to store management information just before execution of a received command that is received by said system controller and management information just after execution of the received command; and
a data recording and reproducing apparatus having a recording medium in which the main data and management information are recordable thereon and reproduceable therefrom, wherein said system controller is operable to inform the external controller of content of a predetermined number of executed commands stored by said status/command storage unit in response to an inquiring command from the external controller, wherein upon receipt of a canceling command for canceling a most recently executed command, said system controller judges whether the most recently executed command is present in said status/command storage unit, wherein when said system controller judges that the most recently executed command is present in said status/command storage unit, management information stored in said management storage unit just before execution of the most recently executed command is read out as prior management information and management information just after the execution of the most recently executed command is replaced with the prior management information while the most recently executed command is deleted from the executed commands stored in said status/command storage unit, and wherein said command processing system is operable to process a plurality of commands sent from said external controller to said data recording and reproducing apparatus via said digital interface.

10. A command processing system operable to process a plurality of commands sent from an external controller to equipment via a digital interface, said command processing system comprising:

a system controller being operable to receive the commands, execute the commands, and process management information of main data based on the commands;

a status/command storage unit being operable to store executed commands; and a management information storage unit being operable to store management information just before execution of a received command that is received by said system controller and management information just after execution of the received command, wherein said system controller is operable to inform the external controller of content of a predetermined number of executed commands stored by said status/command storage unit in response to an inquiring command from the external controller, wherein upon receipt of a canceling command for canceling the most recently executed command, said system controller judges whether the most recently executed command is present in said status/command storage unit, and wherein when said system controller judges that the most recently executed command is absent from said status/command storage unit, said system controller produces a reject response to reject the canceling command.

11. The command processing system of claim 10, wherein, upon receipt of an inquiring command for inquiring as to contents of the executed commands, the executed commands stored in said status/command storage unit are read out as response data.

12. The command processing system of claim 10, wherein said status/command storage unit is operable to store status information indicative of a present operation status of the equipment together with the most recently executed command, and wherein said command processing system further comprises a list generator operable to produce a list of the status information including the most recently executed command.

13. The command processing system of claim 12, further comprising a table of ID codes, wherein the status information includes a plurality of items, wherein each ID code in said table of ID codes is assigned to a corresponding item in the plurality of items, wherein said list generator is operable to produce the list by appending each ID code to its corresponding item to thereby access content of a desired item in the list with reference to the ID code appended thereto.

14. The command processing system of claim 13, wherein an access command for accessing a desired item and obtaining content of the desired item includes an ID-code field, indicating an ID code of the desired item for which content is to be obtained, and wherein the ID code identifies an address position of the desired item in the list.

15. The command processing system of claim 13, wherein the list includes a data structure having continuous plural pairs of items of status information content and corresponding ID) codes added thereto.

16. The command processing system of claim 12, wherein, upon receipt from the external controller of an inquiring command that requests the list and content therein, a response is produced in response to the inquiring command, wherein the inquiring command comprises a command name field indicative of a command name and a list designation field for designating a list of the items, and wherein the response comprises the list and includes a data format of a combination of the status information added to the inquiring command.

17. A system comprising:

an external controller;

a digital interface;

a system controller being operable to receive the commands, execute the commands, and process management information of main data based on the commands;

a status/command storage unit being operable to store executed commands;

a management information storage unit being operable to store management information just before execution of a received command that is received by said system controller and management information just after execution of the received command; and a data recording and reproducing apparatus having a recording medium in which the main data and management information are recordable thereon and reproduceable therefrom, wherein said system controller is operable to inform the external controller of content of a predetermined number of executed commands stored by said status/command storage unit in response to an inquiring command from the external controller, wherein upon receipt of a canceling command for canceling the most recently executed command, said system controller judges whether the most recently executed command is present in said status/command storage unit, wherein when said system controller judges that the most recently executed command is absent from said status/command storage unit, said system controller produces a reject response to reject the canceling command, and wherein said command processing system is operable to process a plurality of commands sent from said external controller to said data recording and reproducing apparatus via said digital interface.

18. A command processing system operable to process a plurality of commands sent from an external controller to equipment via a digital interface, said command processing system comprising:

a system controller being operable to receive the commands, execute the commands, and process management information of main data based on the commands;

a status/command storage unit being operable to store executed commands; and a management information storage unit being operable to store management information just before execution of a received command that is received by said system controller and management information just after execution of the received command, wherein said system controller is operable to inform the external controller of content of a predetermined number of executed commands stored by said status/command storage unit in response to an inquiring command from the external controller, and wherein upon receipt of a rewriting command for rewriting a most recently executed command, said system controller produces a reject response to reject the rewriting command.

19. The command processing system of claim 18, wherein, upon receipt of an inquiring command for inquiring as to contents of the executed commands, the executed commands stored in said status/command storage unit are read out as response data.

20. The command processing system of claim 18, wherein said status/command storage unit is operable to store status information indicative of a present operation status of the equipment together with the most recently executed command, and wherein said command processing system further comprises a list generator operable to produce a list of the status information including the most recently executed command.

21. The command processing system of claim 20, further comprising a table of ID codes, wherein the status information includes a plurality of items, wherein each ID code in said table of ID codes is assigned to a corresponding item in the plurality of items, wherein said list generator is operable to produce the list by appending each ID code to its corresponding item to thereby access content of a desired item in the list with reference to the ID code appended thereto.

22. The command processing system of claim 21, wherein an access command for accessing a desired item and obtaining content of the desired item includes an ID-code field, indicating an ID code of the desired item for which content is to be obtained, and wherein the ID code identifies an address position of the desired item in the list.

23. The command processing system of claim 21, wherein the list includes a data structure having continuous plural pairs of items of status information content and corresponding ID codes added thereto.

24. The command processing system of claim 20, wherein, upon receipt from the external controller of an inquiring command that requests the list and content therein, a response is produced in response to the inquiring command,
   wherein the inquiring command comprises a command name field indicative of a command name and a list designation field for designating a list of the items, and
   wherein the response comprises the list and includes a data format of a combination of the status information added to the inquiring command.

25. A system comprising:
an external controller;
a digital interface;
a system controller being operable to receive the commands, execute the commands, and process management information of main data based on the commands;
a status/command storage unit being operable to store executed commands;
a management information storage unit being operable to store management information just before execution of a received command that is received by said system controller and management information just after execution of the received command; and
a data recording and reproducing apparatus having a recording medium in which the main data and management information are recordable thereon and reproduceable therefrom,
   wherein said system controller is operable to inform the external controller of content of a predetermined number of executed commands stored by said status/command storage unit in response to an inquiring command from the external controller,
   wherein upon receipt of a rewriting command for rewriting a most recently executed command, said system controller produces a reject response to reject the rewriting command, and
   wherein said command processing system is operable to process a plurality of commands sent from said external controller to said data recording and reproducing apparatus via said digital interface.

26. A command processing method for processing a plurality of commands sent from an external controller to equipment via a digital interface, said method comprising:
   receiving the commands and execute the commands to process management information of main data based on the commands;
   storing the executed commands;
   storing management information just before execution of a received command and management information just after execution of the received command;
   informing the external controller of the content of a predetermined number of stored executed commands in response to an inquiring command from the external controller;
   judging whether the most recently executed command is present upon receipt of a canceling command for canceling a most recently executed command; and
   reading out the stored management information just before execution of the most recently executed command as prior management information and replacing management information just after the execution of the most recently executed command with the prior management information, and deleting the most recently executed command from the stored executed commands when the most recently executed command is present.

27. The command processing method of claim 26, further comprising reading out the stored commands as response data to the inquiring command upon receipt of an inquiring command for inquiring as to contents of the executed commands.

28. The command processing method of claim 26, further comprising:
   storing status information indicative of a present operation status of the equipment together with the most recently executed command; and
   producing a list of the status information including the most recently executed command.

29. A command processing method for processing a plurality of commands sent from an external controller to equipment via a digital interface, said method comprising:
   receiving the commands and execute the commands to process management information of main data based on the commands;
   storing the executed commands;
   storing management information just before execution of a received command and management information just after execution of the received command;
   informing the external controller of the content of a predetermined number of stored executed commands in response to an inquiring command from the external controller;
   judging whether the most recently executed command is absent upon receipt of a canceling command for canceling a most recently executed command; and
   producing a reject response to reject the canceling command when the most recently executed command is absent.

30. The command processing method of claim 29, further comprising reading out the stored commands as response data to the inquiring command upon receipt of an inquiring command for inquiring as to contents of the executed commands.

31. The command processing method of claim 29, further comprising:
   storing status information indicative of a present operation status of the equipment together with the most recently executed command; and
   producing a list of the status information including the most recently executed command.

32. A command processing method for processing a plurality of commands sent from an external controller to equipment via a digital interface, said method comprising:
   receiving the commands and execute the commands to process management information of main data based on the commands;
   storing the executed commands;
   storing management information just before execution of a received command and management information just after execution of the received command;
   informing the external controller of the content of a predetermined number of stored executed commands in response to an inquiring command from the external controller; and
   producing a reject response to reject the rewriting command upon receipt of a rewriting command for rewriting a most recently executed command.

33. The command processing method of claim 30, further comprising reading out the stored commands as response data to the inquiring command upon receipt of an inquiring command for inquiring as to contents of the executed commands.

34. The command processing method of claim 32, further comprising:

storing status information indicative of a present operation status of the equipment together with the most recently executed command; and producing a list of the status information including the most recently executed command.

* * * * *

UNITED STATES PATENT AND TRADEMARK OFFICE
CERTIFICATE OF CORRECTION

PATENT NO.    : 6,442,621 B1
DATED         : August 27, 2002
INVENTOR(S)   : Satoshi Kondo et al.

It is certified that error appears in the above-identified patent and that said Letters Patent is hereby corrected as shown below:

<u>Title page,</u>
Item [54], change "EQUIPMENT CONTROL COMMAND PROCESSING SYSTEM AND METHOD THEREOF" to -- SYSTEM FOR PROCESSING COMMAND SENT FROM EXTERNAL CONTROLLER BY EXECUTING INFORMATION STORED JUST BEFORE AND AFTER THE PROCESSING AND INFORMING BACK TO CONTROLLER THE CONTENTS OF COMMAND --.
Item [56], OTHER PUBLICATIONS, change "Subit" to -- Subunit --.
Item [57], ABSTRACT,
Line 2, delete "(111)"; delete "an"; delete "(100,".
Line 3, delete "200)"; delete "(112)".
Line 4, delete "(103)"; change "the last" to -- previously --.
Line 9, delete "(Z)".
Line 10, delete "(X, Y)".
Line 11, delete "(103)".
Line 13, change "last" to -- most recently executed --.

<u>Column 17,</u>
Line 21, change "ID)" to -- ID --.

<u>Column 21,</u>
Line 1, change "claim 30" to -- claim 32 --.

Signed and Sealed this

Eighteenth Day of March, 2003

JAMES E. ROGAN
*Director of the United States Patent and Trademark Office*